United States Patent [19]

Sakamoto

[11] Patent Number: 4,835,620

[45] Date of Patent: May 30, 1989

[54] VIDEO SIGNAL PROCESSING SYSTEM

[75] Inventor: Hitoshi Sakamoto, Kanagawa, Japan

[73] Assignee: Sony Corporation, Tokyo, Japan

[21] Appl. No.: 70,208

[22] Filed: Jul. 6, 1987

[30] Foreign Application Priority Data

Jul. 14, 1986 [JP] Japan ................... 61-165087

[51] Int. Cl.$^4$ ............................................ H04N 5/232
[52] U.S. Cl. .................................... 358/327; 360/36.1
[58] Field of Search ............... 358/327, 323, 324, 328, 358/329, 340, 320, 337, 140, 11, 36, 167; 360/11.1, 35.1, 36.1, 36.2

[56] References Cited

U.S. PATENT DOCUMENTS

| 4,251,830 | 2/1981 | Tatami | 358/320 |
| 4,258,384 | 3/1981 | Tatami | 358/324 |
| 4,376,290 | 3/1983 | Shirota | 358/314 |
| 4,400,719 | 8/1983 | Powers | 358/11 |
| 4,667,240 | 5/1987 | Willis et al. | 360/36.1 |

FOREIGN PATENT DOCUMENTS 2945378 of 1980 Fed. Rep. of Germany .

OTHER PUBLICATIONS

Morrison, "Videotape Recording: Digital Component Versus Digital Composite Recording", SMPTE Journal, pp. 789–796, Sep. 1982.

Primary Examiner—L. T. Hix
Assistant Examiner—David M. Gray
Attorney, Agent, or Firm—Lewis H. Eslinger; Donald S. Dowden

[57] ABSTRACT

A video signal processing system for processing a reproduced video signal includes a first mixing circuit for mixing reproduced video signals of a plurality of television lines with a first combination of mixing coefficients to produce a first interpolated signal, a second mixing circuit for mixing reproduced video signals of a plurality of the television lines with a second combination of mixing coefficients to produce a second interpolated signal and a comparator circuit for comparing odd and even fields of the video signal with reference odd and even fields, whereby the first and second mixing circuits are switched in response to a coincidence or non-coincidence between odd and even fields of the reproduced video signals and reference odd and even fields by the compared output from the comparator circuit. Accordingly, the change of sharpness of the reproduced video signal is reduced regardless of the above coincidence or non-coincidence.

11 Claims, 2 Drawing Sheets

VIDEO SIGNAL PROCESSING SYSTEM

BACKGROUND OF THE INVENTION

1. Field of the Invention

The present invention relates generally to video signal processing systems for processing a reproduced video signal suitable for use with a reproducing system of a professional VTR (video tape recorder). More particularly, this invention relates to a video signal processng system for processing a reproduced video signal suitable for use in à reproducing mode with a variable tape speed very close to a normal tape speed.

2. Description of the Prior Art

When a video signal is reproduced by, for example, a VTR at a variable tape speed very close to the normal tape speed, for example when a video signal one hour and one minute long is reproduced during the period of one hour, a non-coincidence between an odd or even field of the reproduced video signal and a reference odd or even field appears sometimes. If such reproduced video signal is reproduced as is by a monitor television receiver, a flicker occurs in the vertical direction of the reproduced picture and the reproduced picture becomes difficult to see.

Therefore, in the prior art, when the odd and even fields of the reproduced video signal are coincident with the reference off and even fields, they are left as they are, while when they are not coincident, adjacent line signals of the reproduced video signal are averaged arithmetically and then used.

This signal processing will be described with reference to FIGS. 1 and 2. FIG. 1 illustrates a signal of a certain field of the reproduced video signal. In FIG. 1, reference numerals P1 to P4 designate levels of some points on sequential lines $\lambda$, $\beta$, $\gamma$ and $\delta$, wherein the levels P1 and P2 are represented as normalized level 0 while the levels P3 and P4 as normalized level 1, and the level of the video signal is changed from the normalized level 0 to 1 at a point intermediate the adjacent lines $\beta$ and $\gamma$. In this case, x is a coordinate indicative of the location of the line.

When a signal of another field is produced from the signal of the certain field of the reproduced video signal by the above mentioned arithmetic mean processing, it becomes as shown in FIG. 2. In FIG. 2, reference numerals Q1 to Q3 indicate levels of points on sequential lines A, B and C (corresponding to the intermediates of the lines $\alpha$, $\beta$, $\gamma$ and $\delta$ of FIG. 1). The level Q1 becomes the normalized level 0, the level Q2 the normalized level 0.5 and the level Q3 the normalized level 1, respectively. In this case, z is a coordinate indicating the location of the line.

In this case, a level Y (z) of a point on a certain line z is expressed by the following equation.

$$Y(z) = Y(z+\tfrac{1}{2})/2 + Y(z-\tfrac{1}{2})/2$$

If the video signal is processed in this way as in the prior art or a signal of another field is produced from a signal of a certain field of the video signal by arithmetic mean processing, the signal of the resultant field is lowered in the sharpness below that of the signal of the original fields. As a result, the reproduced picture is changed in sharpness and hence the reproduced picture becomes difficult to see.

Therefore, in order to reduce the change of sharpness, it may be considered that the inclination of the level of the original field of the video signal is matched with that of the level of the field of the averaged signal. Levels of the points on the respective lines $\alpha$, $\beta$, $\gamma$ and $\delta$ of the signal of the field with level inclination changed become as shown by P1, P5, P6 and P4 in FIG. 1. In this case, level Y (z) of a point on a certain line z is expressed by the following equation.

$$Y(x) = Y(x)/2 + Y(x\ x+1)/4 + Y(x-1)/4$$

Accordingly, for an inclination with the normalized level of about 0.5, the change of the video signal from the levels P5 to P6 of FIG. 1 becomes the same as the change of the video signal from the levels Q1 - Q2 - Q3 of FIG. 2.

However, in practice, the user does not notice the change of the video signal from the levels P5 to P6 of FIG. 1 but rather the change close to the change of the video signal from the levels P1 - P5 - P6 - P4 of FIG. 1. This means that the sharpness of the reproduced picture is lowered.

OBJECTS AND SUMMARY OF THE INVENTION

Accordingly, it is an object of this invention to provide an improved video signal processing system.

It is another object of the present invention to provide a video signal processing system which can better reduce the change of sharpness of a reproduced picture.

According to one aspect of the present invention, there is provided a video signal processing system for processing a reproduced video signal having at least one type of television field containing television lines, the at least one type of television field being one of an odd field or an even field, comprising:

(a) reference synchronizing signal generating means for generating a reference synchronizing signal operative to define a plurality of types of reference television fields;

(b) means for detecting non-coincidence between a characteristic identifying the at least one type of reproduced television field and a characteristic identifying one of the plurality of types of reference television fields and for producing a control signal in response thereto;

(c) first mixing means for mixing reproduced video signals of a plurality of the television lines with a first combination of mixing coefficients to produce a first interpolated signal;

(d) second mixing means for mixing reproduced video signals of a plurality of the television lines with a second combination of mixing coefficients to produce a second interpolated signal; and (e) means for selectively producing output video signals containing only one of said first and second interpolated signals in response to said control signal.

These and other objects, features and advantages of the present invention will become apparent from the following detailed description of the preferred embodiment that is to be read in conjunction with the accompanying drawings, in which like reference numerals identify like elements and parts.

DESCRIPTION OF THE PREFERRED EMBODIMENT

A fundamental principle of the present invention will be described first with reference to FIG. 3.

Figure 1:
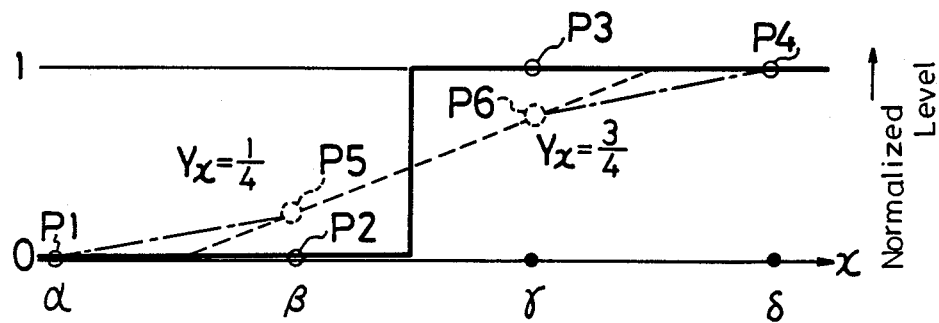
FIGS. 1 and 2 are respectively schematic representations used to explain the present invention.
Figure 2:
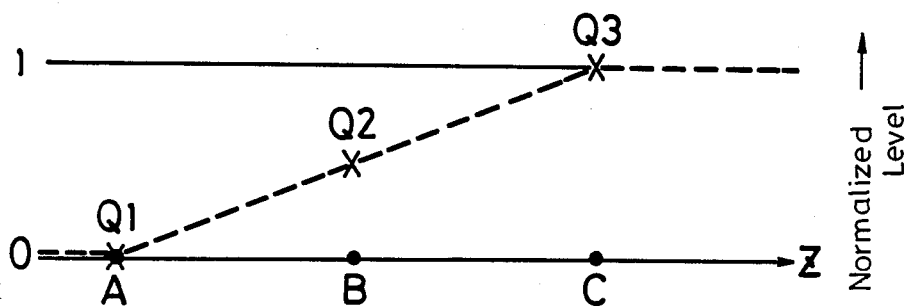
Figure 3:
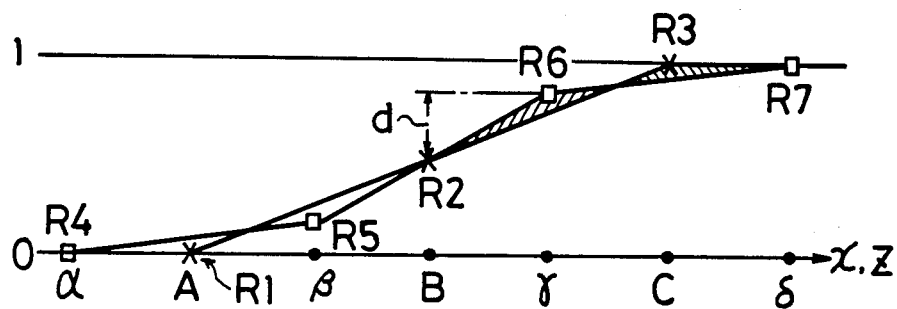
FIG. 3 is a schematic representation useful for explaining a fundamental principle of the present invention.

Referring to FIG. 3, the change of levels R1 - R2 -R3 corresponds to the change of levels Q1 -Q2 -Q3 of FIG. 2. Accordingly, if a level R6 is selected such that an area of a polygon formed by connecting points B - R2 - R3 - R7 (corresponding to P4 of FIG. 1) - δ - B becomes equal to an area of a polygon formed by connecting points B - R2 - R6 -R7 - δ -B and if a level R5 is selected such that an area of a polygon formed by connecting points B - R2 - R1 - B becomes equal to an area of a polygon formed by connecting points B - R2 - R5 - R4 - B, the sharpness of a signal of a field processed by the arithmetic mean processing and that of a signal of a field which is not processed similarly become equal to each other.

Calculating a difference d between the levels R6 and R2 yields ⅓ (normalized level). Thus, the sharpness of a signal in a field of a video signal in which odd and even fields are coincident with reference odd and even fields becomes equal to the sharpness of a signal of a field resulting from the arithmetic mean processing of the lines of another field of a video signal when the odd and even fields are not coincident with odd and even fields of the reference signal, by the following mixture processing with a combination of mixing coefficients.

$$Y(x) = 2Y(x)/3 + Y(x+1)/6 + Y(x-1)/6$$

Now, a circuit arrangement of an embodiment according to the present invention will hereinafter be described with reference to FIG. 4.

Figure 4:
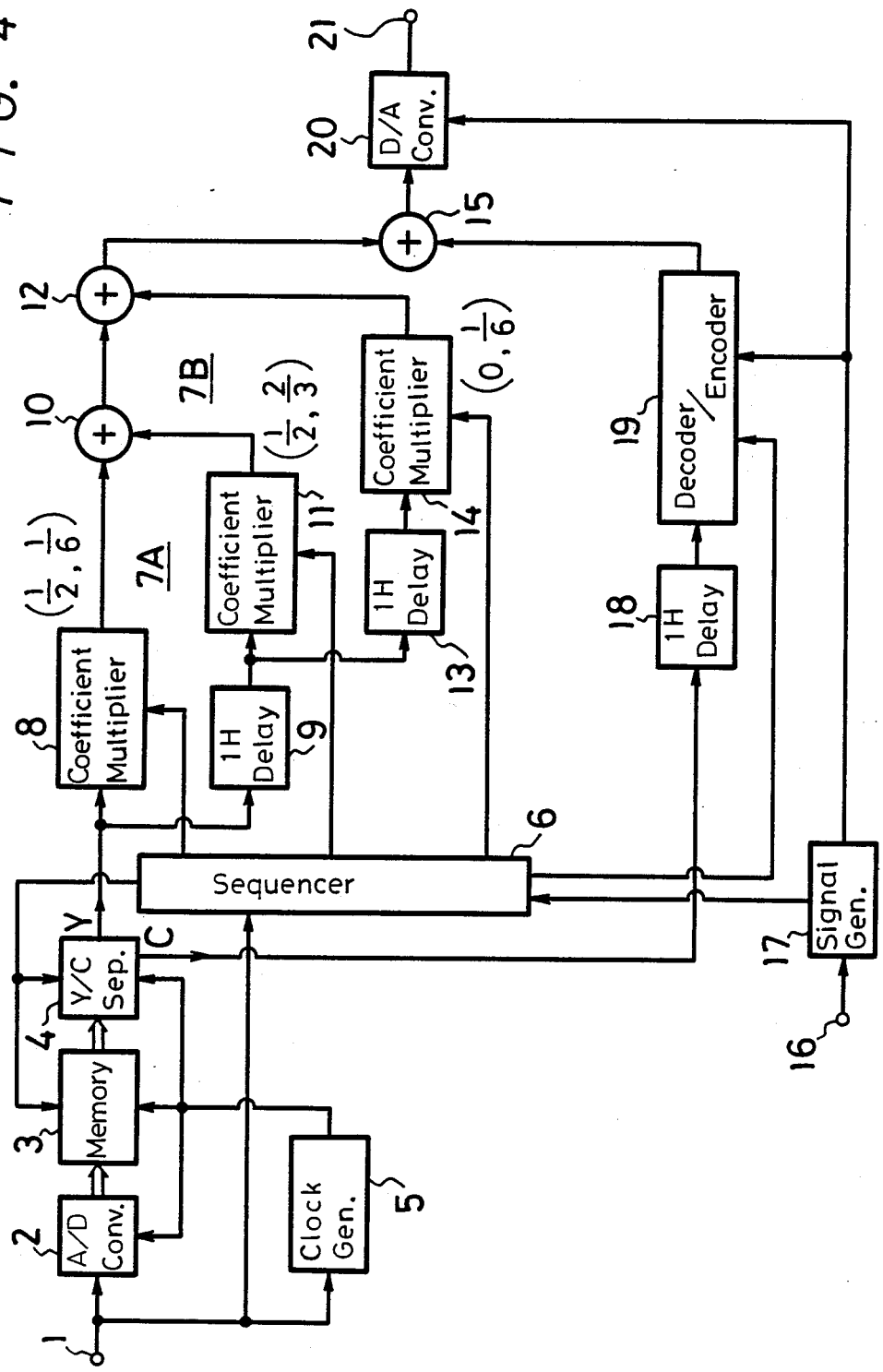
FIG. 4 is a block diagram showing an embodiment of a video signal processing system according to the present invention.

Referring to FIG. 4, a color video signal is supplied to an input terminal 1. The color video signal applied to the input terminal 1 is supplied to an A/D (analog-to-digital) converter 2, in which it is converted to a digital color video signal. The digital color video signal is then supplied to a memory (which may serve as a memory for a time base corrector) 3 and written therein. The digital color video signal read out from this memory 3 is supplied to a luminance/chrominance separating circuit 4, in which it is separated into a luminance signal Y and a chrominance signal (carrier chrominance signal) C. A clock generator 5 is provided which is adapted to generate a clock signal on the basis of a horizontal synchronizing signal and a burst signal contained in the color video signal applied thereto from the input terminal 1. This clock signal is supplied to the A/D converter 2, the memory 3 and the luminance/chrominance separating circuit 4.

A sequencer (comparator) 6 is provided which receives the color video signal from the input terminal 1 and a reference field signal from a signal generator 17 and compares the reproduced field signal from the color video signal and the reference field signal from the signal generator 17 to thereby produce control signals to be supplied to respective circuit portions which will be described later. The signal generator 17 receives an external mixed reference signal from an input terminal 16, produces a clock signal on the basis of the external mixed reference signal and supplies the same to the respective circuit portions which will be described later.

The luminance signal Y from the luminance/chrominance separating circuit 4 is supplied to first and second weighting/averaging circuit or mixing circuits 7A and 7B. The first mixing circuit 7A comprises a first coefficient multiplier (its mixing coefficients are 178 and 1/6) 8 which is supplied with the luminance signal, a first 1H delay circuit 9, a second coefficient multiplier (its mixing coefficients are 178 and ⅔) 11 which is supplied with a luminance signal delayed by the first 1H delay circuit 9, and a first adder 10 which adds the luminance signals multiplied with the mixing coefficients by the first and second coefficients multipliers 8 and 11. In this case, 1H represents one horizontal period.

The second mixing circuit 7B comprises the first coefficient multiplier (its mixing coefficients are 178 and 1/6) 8 which is supplied with the luminance signal, the first 1H delay circuit 9, the second coefficient multiplier (its mixing coefficients are 178 and ⅔) 11 which is supplied with the luminance signal delayed by the first 1H delay circuit 9, the first adder 10 which adds the luminance signals multiplied with the mixing coefficients by the first and second coefficient multipliers 8 and 11, a second 1H delay circuit 13 which is supplied with the delayed luminance signal from the first 1H delay circuit 9, a third coefficient multiplier (its mixing coefficients are 0 and 1/6) 14 and a second adder 12 which is supplied with the output from the first adder 10 and the delayed luminance signal multiplied with the mixing coefficients by the third coefficient multiplier 14.

The mixing coefficients of the first, second and third coefficient multipliers 8, 11 and 14 are switched by the control signals from the sequencer 6 as follows.

When odd and even fields of the color video signal applied to the input terminal 1 are not coincident with odd and even fields of the external reference signal, the mixing coefficients of the first to third coefficient multipliers 8, 11 and 14 are selected to be ½, ½ and 0, respectively. Accordingly, a digital luminance signal Y(z) derived from the second adder 12 is expressed by the following equation.

$$Y(z) = Y(z+\tfrac{1}{2})/2 + Y(z-\tfrac{1}{2})/2$$

When the odd and even fields of the color video signal applied to the input terminal 1 coincide with the odd and even fields of the external reference signal, the mixing coefficients of the first to third coefficients multipliers 8, 11 and 14 are respectively selected to be 1/6, ⅔ and 1/6. Accordingly, the digital luminance signal Y(x) derived from the second adder 12 is expressed by the following equation.

$$Y(x) = 2Y(x)/3 + Y(x+1)/6 + Y(x-1)6$$

Consequently, the sharpness of the luminance signal obtained at the output side of the second adder 12 is equal regardless of whether the odd and even fields of the color video signal supplied to the input terminal 1 coincide with the odd and even fields of the external reference signal.

Meanwhile, the chrominance signal (carrier chrominance signal) from the luminance/chrominance separating circuit 4 is supplied through a third 1H delay circuit 18 to a decoder/encoder 19. The decoder/encoder 19 is supplied with the clock signal from the sequencer 6.

Then, the digital luminance signal from the second adder 12 and the digital color video signal from the decoder/encoder 19 are supplied to a third adder 15, in which they are added. The added output therefrom is supplied to a D/A (digital-to-analog) converter 20, in which it is converted to an analog color video signal and then fed to an output terminal 21. This D/A converter 20 is supplied with the clock signal from the signal generator 17.

According to the present invention, as set forth above, it becomes possible to obtain a video signal processing system in which the change of sharpness of a reproduced picture can be reduced regardless of whether the odd and even fields of the video signal coincide with the odd and even fields of the external reference signal.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as my invention:

1. A video signal processing system for processing a reproduced video signal having at least one type of television field containing television lines, said at least one type of television field being one of an odd field or an even field, comprising:

reference synchronizing signal generating means for generating a reference synchronizing signal operative to define a plurality of types of reference television fields;

means for detecting non-coincidence between a characteristic identifying said at least one type of reproduced television field and a characteristic identifying one of said plurality of types of reference television fields and for producing a control signal in response thereto; and mixing means having first and second configurations and in said first configuration mixing reproduced video signals of a plurality of said television lines with a first combination of mixing coefficients to produce a first interpolated signal;

said mixing means in said second configuration mixing reproduced video signals of a plurality of said television lines with a second combination of mixing coefficients to produce a second interpolated signal; and said control signal controlling the configurations of said mixing means in order selectively to produce output video signals containing one of said first and second interpolated signals.

2. A video signal processing system according to claim 1, in which said mixing means in said first configuration includes a first delay circuit having a delay time of one horizontal period for producing a first delayed reproduced video signal and means for adding said first delayed reproduced video signal and said reproduced video signal with said first combination of mixing coefficients.

3. A video signal processing system according to claim 2, in which said first combination of mixing coefficients comprises one half for said first delayed reproduced video signal and one half for said reproduced video signal.

4. A video signal processing system according to claim 1, in which said mixing means in said second configuration includes a first delay circuit having a delay time of one horizontal period for producing a first delayed reproduced video signal, a second delay circuit having a delay time of one horizontal period, said second delay circuit being cascaded with said first delay circuit for producing a second delayed reproduced video signal having a total delay time of two horizontal periods, and means for adding said reproduced video signal and said first and second delayed reproduced video signals with said second combination of mixing coefficients.

5. A video signal processing system according to claim 4, in which said second combination of mixing coefficients comprises one sixth for said reproduced video signal, two thirds for said third delay reproduced video signal and one sixth for said fourth delayed reproduced video signal.

6. A video signal processing system according to claim 1, in which said mixing means in said first configuration includes a first delay circuit having a delay time of one horizontal period for producing a first delayed reproduced video signal, a first multiplier for multiplying said reproduced video signal with a first mixing coefficient, a second multiplier connected to said first delay circuit for multiplying said first delayed reproduced video signal with a second mixing coefficient and means for adding said reproduced video signal from said first multiplier and said first delayed reproduced video signal from said second multiplier.

7. A video signal processing system according to claim 6, in which said mixing means in said second configuration includes said first delay circuit, a second delay circuit having a delay time of one horizontal period for producing a second delayed reproduced video signal by delaying an output from said first delay circuit, said first and second multipliers and a third multiplier connected to said second delay circuit for multiplying said second delayed reproduced video signal with a third mixing coefficient, wherein said second delayed reproduced video signal from said third multiplier is supplied to said adding means.

8. A video signal processing system according to claim 7, wherein said detecting means comprises sequencer means for controlling said first, second and third mixing coefficients in said first, second and third multipliers in response to said control signal.

9. A video signal processing system according to claim 8, in which said sequencer means controls said first, second and third mixing coefficients to be 1/6, ⅔ and 1/6 when said control signal does not indicate said non-coincidence and ½, ½ and 0 when said control signal indicates said non-coincidence.

10. A video signal processing system for processing a reproduced video signal, said system comprising:

means for generating a reproduced video signal arranged in successive odd and even fields, each of said fields including a plurality of lines;

means for generating a reference signal representing successive odd and even reference fields;

the fields of said reproduced video signal and said reference fields occurring at rates that are nearly but not quite the same, so that there is successive coincidence and noncoincidence between the odd fields of the reproduced video signal and the odd fields of the reference signal and between the even fields of the reproduced video signal and the even fields of the reference signal;

comparator means responsive to said reproduced signal and said reference signal for determining said coincidence or noncoincidence and producing a control signal representative thereof; and mixing means responsive to said control signal for deriving a video signal level by mixing signals representing two adjacent lines of said reproduced video signal in case of said noncoincidence and deriving a video signal level by mixing signals representing three adjacent lines of said reproduced video signal in case of said coincidence.

11. A video signal processing system according to claim 10 wherein said mixing means comprises a plurality of coefficient multipliers each having a plurality of mixing coefficients, said mixing coefficients being selectively activated in response to said control signal.

* * * * *